United States Patent [19]

Lefferts et al.

[11] 4,451,957
[45] Jun. 5, 1984

[54] APPARATUS FOR JOINING THE ENDS OF A BELT TO MAKE IT ENDLESS

[75] Inventors: Johannes Lefferts, Enschede; Roelof Roelofs, Hengelo, both of Netherlands

[73] Assignee: Steg Siebtechnik GmbH, Fed. Rep. of Germany

[21] Appl. No.: 265,948

[22] Filed: May 21, 1981

[30] Foreign Application Priority Data

May 30, 1980 [DE] Fed. Rep. of Germany ....... 3020690

[51] Int. Cl.³ .............................................. A44B 19/00
[52] U.S. Cl. ........................................ 24/573; 24/391; 24/415; 29/241; 29/433
[58] Field of Search ................... 24/205 R, 205.15 R, 24/205.15 E, 205.16 R, 31 H, 31 R, 33 R; 29/241, 433, 235

[56] References Cited

U.S. PATENT DOCUMENTS

| 3,070,864 | 1/1963 | Pfeffer | 24/205.15 R |
| 3,280,435 | 10/1966 | Hasworthy | 29/433 |
| 3,731,365 | 5/1973 | Fryatt | 29/241 |
| 3,757,402 | 9/1973 | Haythornthwaite et al. | 29/241 |
| 4,075,740 | 2/1978 | Svensson | 29/241 |
| 4,112,570 | 9/1978 | Svensson | 29/433 |

Primary Examiner—Gene Mancene
Assistant Examiner—James Hakomaki
Attorney, Agent, or Firm—Sughrue, Mion, Zinn, Macpeak, and Seas

[57] ABSTRACT

A slide apparatus for joining ends of a belt of the type having a plurality of transverse interlocked spiral elements. The slide apparatus includes two tapered overlapping channels for the reception of the overlapping belt ends so that upon movement of the slide apparatus the overlap of the belt ends will be reduced. The tapered channels terminate in a common narrow channel having a width equal to the overlapped end spiral elements so that upon passage of the two belt ends from the narrow channel a spring biased pusher element will force the overlapped spiral elements into meshing engagement, wherein a pintle wire, inserted into the passage defined by the intermeshed spiral elements, connects the belt ends.

3 Claims, 6 Drawing Figures

APPARATUS FOR JOINING THE ENDS OF A BELT TO MAKE IT ENDLESS

BACKGROUND OF THE INVENTION

The present invention is directed to a method for joining the ends of a belt to make it endless, for example, a papermachine screen, and a slide apparatus for carrying out said method. The method of the invention is applicable in all cases where two belt ends have loops or bights which are interlocked in the fashion of a zipper with a pintle wire inserted into the passage formed by the meshing bights, loops or windings.

In connection with papermachine screens, it has been known to back-weave the warp thread ends of flat-woven screens so that loops are formed at the screen ends which can then be joined in the manner described above by the insertion of a pintle wire. Moreover, spirals can be sewn to the ends of a flat-woven papermachine screen so that the ends can be joined by means of a pintle wire. In all these methods the principal problem involves holding the ends of the belt or papermachine screen in proper spaced relation with respect to each other so that the bights, loops or windings of the two ends can be intermeshed with each other and subsequently held in the intermeshed position until the pintle wire can be inserted. Since the ends of a papermachine screen are frequently joined after the screen has been threaded into the paper making machine, no bulky apparatus can be used to connect the ends.

French Patent No. 2,339,806 discloses a method by which such a spiral seam can be made. In order to hold the two screen ends in proper spaced relation for making the spiral seam, one half of a zipper is mounted to each screen end. The two screen ends are joined by closing the zipper to hold the screen ends in position. The windings of the spirals are then intermeshed and the pintle wire is passed therethrough. The problem arising with this method is that the zipper halves must be fastened to the screen at the proper distance from the ends thereof so that the windings of two spirals can be properly positioned relative to each other.

SUMMARY OF THE INVENTION

The present invention provides a unique simple method for joining the ends of a belt to make it endless and a slide for carrying out said method.

The present invention provides a new and improved method for joining the ends of a belt of the type having a plurality of spiral members extending transversely of the belt with a spiral member at each end of the belt comprising securing two spiral members to a pair of fabric mounting strips, respectively, and securing said mounting strips by means of said spiral elements to spiral elements of said belt spaced from each end spiral element, respectively. The sum of the widths of the two mounting strips is less than the sum of the distances from each mounting spiral element to each end spiral element of the belt so that the ends of the belt will substantially overlap when the free ends of the mounting strips are secured together. The amount of overlapping of the belt ends is reduced by means of a slide apparatus so that the end spiral elements overlap by an amount sufficient to define the passage for a securing pintle wire subsequent to the pressing of the overlapping spiral elements into meshing engagement with each other by passage of said slide apparatus.

The present invention provides a new and improved slide apparatus for intermeshing the loops of the two end sprial elements of a belt comprising a base plate, an intermediate plate and a top plate with said base plate and intermediate plate defining superimposed channels for receiving the overlapped ends of said belt. The channels decrease in width and merge into a single narrow channel for reducing the overlap of the belt ends as the slide apparatus moves across the width of the belt ends. The width of the narrow channel is such as to place the end spirals in overlapping relation whereby continued passage of the spirals through the apparatus will cause the spirals to be forced into intermeshing overlapping engagement with each other to define a passage for the reception of a pintle wire to detachably interconnect the end spiral elements.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
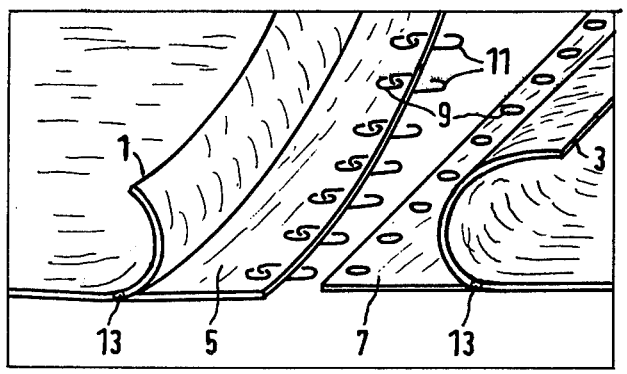
FIG. 1 is a perspective view showing the two screen ends with the mounting strips secured thereto prior to the joining of the two mounting strips.
Figure 2:
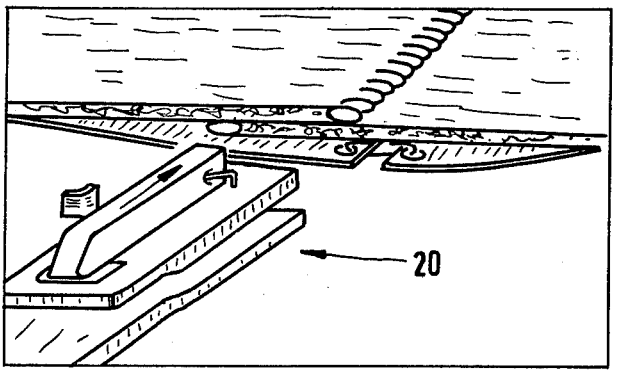
FIG. 2 is a perspective view showing the spiral screen with the overlapping screen ends after joining of the mounting strips.
Figure 3:
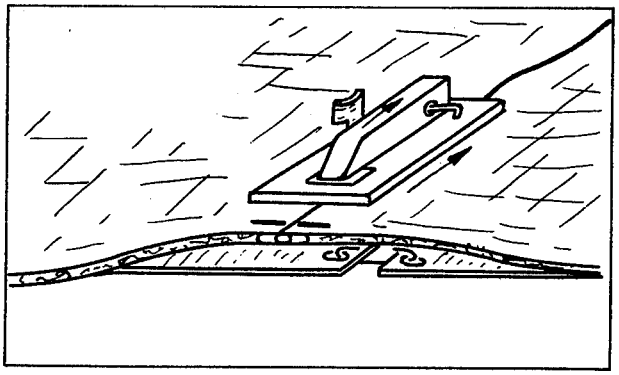
FIG. 3 is a perspective view of the spiral screen with the initial spirals of the two screen ends interlocked by the interlocking slide.

The method of the invention and the slide of the invention are suited especially to join the ends of spiral screens such as those known from German patent applications (OS) 24 19 751 and 29 38 221. Before the ends of a spiral screen are joined to make it endless the screen is first threaded into the papermaking machine as usual with the held of a lead piece. After threading the lead piece is detached by removal of the pintle wire.

The screen ends 1 and 3 are fastened one to the other in overlapping relation by means of mounting strips 5 and 7 which are fastened to the screen at a predetermined distance from the screen ends 1 and 3. This distance is selected such that the total of the widths of the mounting strips 5 and 7, i.e. their dimensions in the direction of screen length, is less than the total of the distances between the attaching line of the mounting strips 5 and 7 and the screen ends 1 and 3. In practice it has proved to be advisable to made the difference about equal to ten times the distance between two adjacent pintle wires in the screen. However, the method is operable also when the difference is lesser or greater.

The mounting strips can be secured to the screen by stapling, taping or the like. It has proved to be especially effective to fasten the mounting strips to the spiral screen by fastening spirals 13. To this end three longitudinal threads are pulled out of the fabric of the mounting strips at about the middle thereof, i.e., threads that would extend in the transverse direction of the screen. The windings of the fastening spirals 13 are inserted between the transverse threads which are exposed over a short length and a pintle wire is inserted into the fastening spiral 13 to hold the spiral 13 to the mounting strip. The two fastening spirals 13 are secured to the spiral screen by further pintle wires, e.g. steel wires, at the desired distance from the screen ends 1 and 3. Preferably the mounting strips 5 and 7 are fastened to the spiral screen before the screen is threaded into the machine.

In practice it has proved to be advantageous to use mounting strips 5 and 7 of fabric or a material which is rather supple, i.e. a material less stiff than that of the spiral screen itself. Minor irregularities of the sprial screen, e.g. not absolute straightness of the pintle wires or out-of-true threading of the spiral screen into the drying section of the papermaking machine, will not affect the seam and will not result in wavy deformation of the spiral screen. The mounting strip will, on the other hand, take up the irregularities and undergo a wavy deformation or buckling. In case the fabric of the mounting strips 5 and 7 is too stiff or too strong, there is the risk that the seam region will become wavy and the seam can be closed only with difficulty.

In order to join the two screen ends 1 and 3 after the spiral screen has been inserted into the papermaking machine the mounting strips 5 and 7 are joined first, for example, by hooks 11 engaging eyes 9 in the two mounting strips 5 and 7. After connection of the mounting strips 5 and 7 to each other the screen ends are no longer under tension. Due to the above mentioned selection of the distance of the mounting of the strips 5 and 7 from the screen ends 1 and 3 the screen ends 1 and 3 will overlap after the connection of the mounting strips 5 and 7 to each other. The screen ends 1 and 3 are then urged apart either by hand or by means of the slide 20 described hereinafter so that they just overlap by about half of the width of the spirals. The last spirals of the two screen ends 1 and 3 are then urged one into the other by a force acting normal to the screen plane on the one spiral and a corresponding counteracting force on the other spiral and a pintle wire is inserted into the passageway formed by the two interlocked spirals. The two screen ends 1 and 3 are thereby joined and the mounting strips 5 and 7 can be removed by pulling out the pintle wires anchoring the fastening spirals 13 in the spiral screen.

Figure 4:
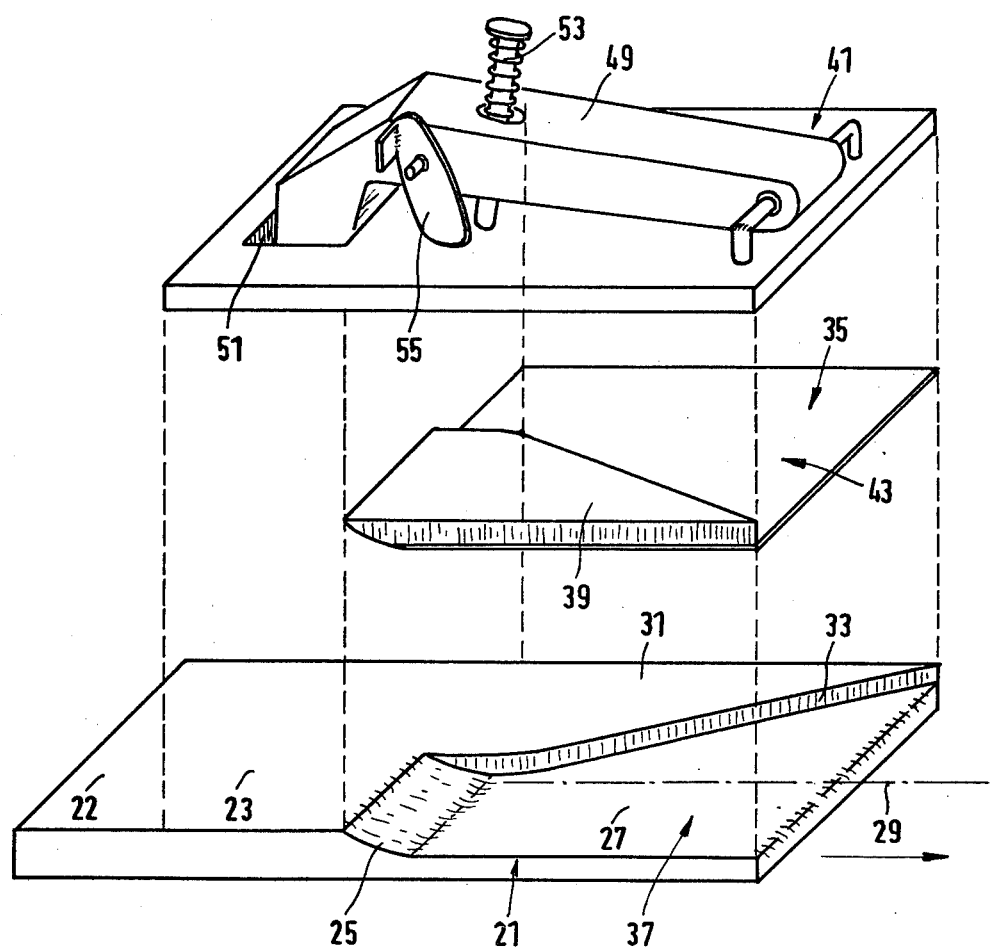
FIG. 4 is a perspective exploded view of the slide according to the present invention.

The slide 20 has a base plate 21 shown for simplicity's sake in rectangular form in FIG. 4. The base plate 21 has a raised portion 23 merging with a slope 25 into a lower portion 27. The transition from the raised portion 23 to the slope 25 and from there to the lower portion 27 is smooth and without any edges. The slope 25 extends about normal to the longitudinal axis 29 of the side 20. The base plate 21 has a second raised portion 31 separated from the lower portion 27 by a step 33. The step 33 extends at a very acute angle to the longitudinal axis 29. The angle is suitably less than 20°. The heights of the first raised portion 23 and of the second raised portion 31 relative to the lower portion 27 are equal in the embodiment illustrated in FIG. 4 so that the two raised portions 23 and 31 are at equal level.

An intermediate plate 35 substantially coextensive with portions 27 and 31 is secured to the second raised portion 33, e.g. by adhesion. Between the base plate 21 and the intermediate plate 35 a first channel 37 is formed which is defined on one side by the step 33 while on the other side and toward the front it is open. The channel ascends along the slope 25 and opens toward the first raised portion 23. The intermediate plate 35 terminates above the slope 25 and curves upwardly in this region so that the height of the first channel 37 remains constant in the region of the slope 25. The height of the first channel 37 which is equal to the height of the step 33 is somewhat greater than the thickness of the spiral screen. The intermediate plate 35 has a raised portion 39 on the upper surface which in plan view is a mirror-reversed image of the raised portion 31 relative to the longitudinal axis 29 and whose height is likewise somewhat greater than the screen thickness.

Figure 5:
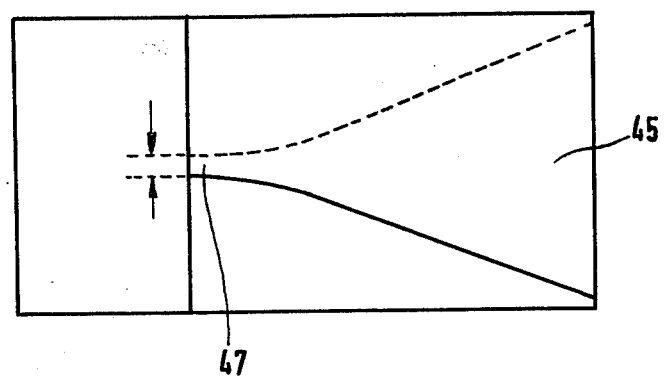
FIG. 5 is a top plan view of the base plate and the intermediate plate of the side in overlapping relation.

A top plate 41 is secured to the upper surface of the raised portion 39 of the intermediate plate 35 so as to define a second channel 43 between the intermediate plate 35 and the top plate 41 which tapers in the same direction as the first channel 37. The second channel 43, in the embodiment illustrated in FIG. 4, merges into the first raised portion 23 of the base plate 21 at substantially the same level. As shown in FIG. 5, the first and the second channels 37 and 43, when viewed from the top, form an imaginary overlapping area 45 the sides of which define an acute angle $2\alpha$ and merge at the top into a narrow channel 47 having a width about half of the width of the spirals forming the spiral screen. The angle between the step 33 of the second raised portion 31 and the corresponding step of the raised portion 39 of the intermediate plate 35 gradually converges toward zero in the region of the narrow channel 47 where the steps become parallel.

The top plate 41 extends rearwardly beyond the intermediate plate 35. A spring biased pusher bar 49 is provided which is resiliently urged against the first raised portion 23 in alignment with the channel 47. The width of the pusher bar 49 corresponds at least to that of the narrow channel 47. As shown in FIG. 4, the pusher bar 49 is a lever pivoted at one end with the other end extending through an opening 51 in the top plate 41. The lever is guided by a pin 53 extending upwardly from the top plate 41 and a helical compression spring urging the lever downwardly is seated against an abutment at the upper end of the pin 53. By rotation of a cam 55 the lever can be held in its raised position against the force of the spring.

The base plate 21, in turn, extends suitably beyond the rear end of the top plate 41 thereby forming a support portion 22 on which the first few windings of the spirals can be interlocked by hand. When a slide without pusher 49 is used, the projecting portion 22 of the base plate 21 generally serves as a support to urge the windings into engagement. Moreover, a pusher bar 49 is not necessary when the distance between the base plate 21 and the top plate 41 is accurately dimensioned because the windings of the spirals are then urged into each other because of the precisely dimensioned distance.

The basic idea underlying the design of the slide 20 resides in the idea that the two screen ends 1 and 3 are urged apart by two flat, laterally open channels whose lateral walls converge opposite to the direction in which the slide 20 is moved. The flat channels extend one above the other in parallel planes and merge by ascent of the one or descent of the other channel to form one common channel at the beginning of which the windings of the spirals engage. At the point where the two flat channels merge into a common channel the lateral walls of the channels are spaced apart a distance corresponding to about half the spiral width, i.e. the amount to which the overlapping of the screen ends 1 and 3 is reduced.

The slide 20 is used such that the one screen end 1 is introduced along the longitudinal axis 29 into the first channel 37 and the other screen end 3 is introduced into the second channel 43. The slide is then moved across the screen width in the direction of the arrow in FIG. 4. The stepped edges of the raised portions 31 and 39 shift the initially relatively wide overlapping screen ends 1 and 3 so that in the narrow channel 47 they overlap only by the width of the channel 47, i.e. about half the width of one spiral. In this region the first channel 37 rises up the slope 25 so that the outermost edges of the two screen ends 1 and 3 are urged one against the other and the windings of the last spirals of the two screen ends 1 and 3 interlock. The force required to make the spiral windings engage is exerted by the pusher 49. The screen ends 1 and 3 therefore leave the slide 20 with their spiral ends interlocked. A pintle wire can be inserted into the passageway formed by the interlocked last spirals to complete the connection of the two screen ends 1 and 3.

The foregoing description of the slide 20 makes it readily apparent that the first raised portion 23 of the base plate 21 can be omitted if in this region the top plate 41 has a corresponding thicker portion on its underside so that the free space between the base plate 21 and the top plate 41 in the region rearwardly of the intermediate plate 35 again corresponds substantially to the thickness of the screen. The rear edge of the second raised portion 31 of the base plate 21 in that case is rounded and curves downwardly in a smooth curve in order that the screen end emerging from the second channel 43 will suitably not be excessively bent.

The base plate 21 can be provided with a first raised portion 23 disposed at a level about half as high as that shown in FIG. 4 above the lower portion 27 provided that in said region the top plate 41 is correspondingly thicker so that the free space again corresponds approximately to the thickness of the screen. It is only essential that the first channel 37 and the second channel 43 end in a space confined on top and bottom with a height slightly exceeding the thickness of the screen.

Figure 6:
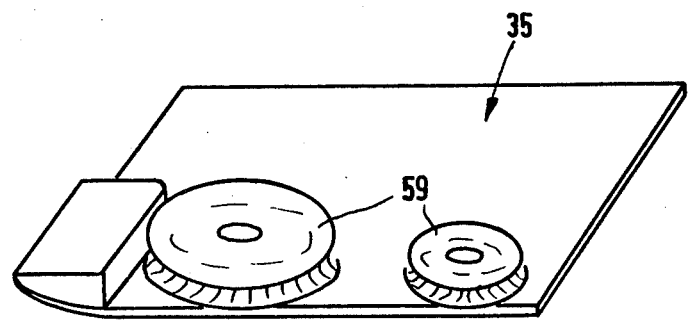
FIG. 6 is a partial perspective exploded view of the slide showing the base plate and the intermediate plate of a further embodiment of the slide.
Figure 6:
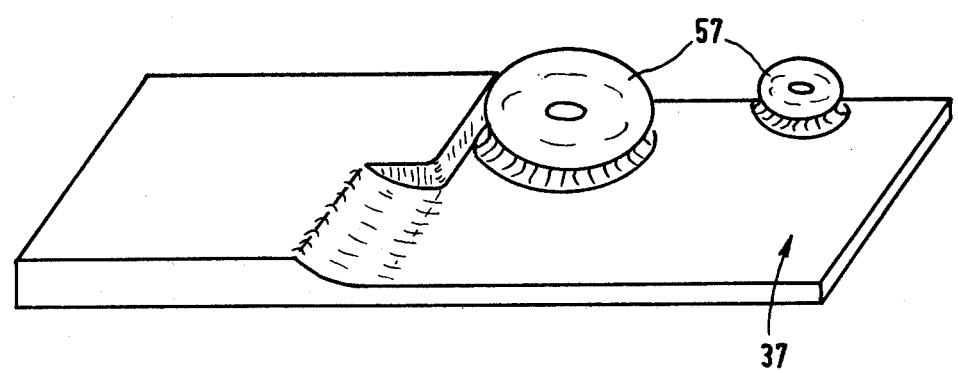

In order to reduce the force required for moving the slide along the seam, the base plate 21, the intermediate plate 35, and the top plate 41 may be provided with rolls guiding the screen ends 1 and 3. In the embodiment of FIG. 6 two rolls 57 form the second raised portion 31 of the base plate 21. Likewise, two rolls 59 form the raised portion 39 of the intermediate plate 35. The top plate 41 is not shown in FIG. 6 since it is identical with the embodiment of FIG. 4. In order to improve the guidance of the screen ends 1 and 3 the rolls 57, 59 can be provided around their periphery with a groove. To further improve the guidance of the screen ends 1 and 3 a ribbon or belt may pass about the two rolls 57 and about the two rolls 59.

EXAMPLE

The desired length of the spiral screen is marked on one side of the spiral screen and the superfluous parts are cut off such that the last spiral on one screen end has left-hand turns while the last spiral on the other screen end has right-hand turns. Then two mounting strips having a width of 20 cm and 10 cm are prepared from jute fabric. To this end two strips of jute fabric 30 cm and 50 cm wide are use and in the middle thereof three warp threads are pulled out so that short slits are left in the jute fabric strips. The turns of a fine fastening spiral are pressed into said slits and a monofilamentary pintle wire of 0.7 mm thickness is inserted into the fastening spiral. The fastening spiral consists of a monofilament of 0.5 mm diameter and is 7.4 cm wide and 3.1 mm thick. The fastening spirals are adhered with an adhesive tape not too thick to the side of the jute strips where the monofilament pintle wire has been inserted. The jute strips are now folded along the fastening spiral so that the monofilamentary pintle wire is inside and the turns of the fastening spiral extend outwardly. Staples spaced apart about 15 cm are pressed into the folded jute strips to fix the folds. The long jute strip edges without fastening spirals are folded once more by 5 cm and stapled. These edges are thus folded once more so that in a marginal region of 5 cm there are obtained four layers of jute fabric. In said marginal strip holes are punched by means of a puncher having a diameter of 16 mm and spaced 3 cm from the lateral ends and spaced 25 cm apart. The distance from the edge is 1 cm. By means of an eyelet punch brass eyelets are punched into said holes. The short edges are glued together. When making the holes for the brass eyelets care has to be taken that the spacing between the eyelets in the two strips is precisely equal. Hooks are inserted into the eyelets of the final mounting strip which is 20 cm wide.

The screen ends are now placed on a table with the paper face upwards, the spirals of the seam, i.e. the last spirals of the two screen ends, are urged one into the other, and the direction of travel is marked on the screen. On both sides two black lines are drawn at a distance of 2 cm from the screen edge.

The mounting strips are connected by means of the hooks and placed on the screen. The middle of the hooks must be disposed about 7 cm behind the seam. The mounting strips are then pulled taut and on the side opposite the paper side the locations of the fine fastening spirals in the mounting strips are marked. This marking can best be done by pushing needles through the spiral screen.

The screen ends are then separated from one another and placed on the table with their back side up (paper side facing downwardly). Also the mounting strips are separated from each other and placed on the back side of the spiral screen. From the marked locations five spirals away from the screen ends are skipped and the fine fastening spirals of the mounting strips are urged into the next following spiral of the spiral screen. This can best be done by means of a grooved board placed underneath the spiral screen. The spirals are anchored in the spiral screen by steel wires of 0.7 mm diameter, said steel wires being inserted into the spirals similar to pintle wires. The ends of the steel wires projecting from both screen endges are secured at the screen edges by adhesive tape. The staples may be removed from the mounting strip.

For a check the screen ends are placed once more on the first-named table with the paper side upwards and the mounting strips are connected by means of the hooks. The screen ends must now overlap sufficiently, even when the spiral screen is tightened. For example, the overlapping must correspond to seven spirals. With the slide an attempt is made to determine whether the seam can be closed without difficulties. If everything is as it should be, the lead piece can be fastened to the screen end with the narrow mounting strip without hooks and the screen can be wound up on a tube. The interior end of the spiral screen must be protected from the hooks and to this end a narrow board with a groove is also wound into the roll.

The spiral screen is threaded into the papermaking machine by means of the lead piece, and the lead piece is then removed by extracting the pintle wire. The tensioning means of the papermaking machine is turned back until the mounting strips can be connected by means of the hooks. The two screen ends are placed into a slide at one end of the seam and are overlapped along the entire length of the screen ends. When the slide is placed on the screen the pusher is first raised. The first spirals of the seam are engaged by hand. The markings across the seam must be in alignment. The two outer turns of the spirals must not point against the direction of travel. The pusher is then released and the slide is slowly moved along the seam. After the entire seam has been closed by means of the slide a lead wire with an attached pintle wire is pushed through the passageway formed by the two last spirals of the screen ends. The inserted pintle wire is trimmed on both sides and the trimmed ends are bent against the direction of travel and turned back into the spiral screen. The steel pintle wires of the fastening spirals are then pulled out so that the mounting strips can be taken off. The screen edges are then covered with an adhesive at the site of the seam.

While the invention has been particularly shown and described with reference to preferred embodiments thereof, it will be understood by those in the art that the foregoing and other changes in form and details may be made therein without departing from the spirit and scope of the invention.

What is claimed is:

1. A slide for joining two initially overlapping belt ends together wherein each end is provided with a plurality of loops across the width thereof comprising a base plate, an intermediate plate, a top plate, a first tapered channel located in a plane of said base plate between said base plate and the intermediate plate, and a second tapered channel located in the plane of said intermediate plate between said intermediate plate and said top plate, said channels, when viewed perpendicular to said base plate forming an acute-angled overlapping area for receiving the overlapping belt ends, said acute-angled overlapping area terminating in a narrow overlapping area adapted to bring the loops of the overlapping belt ends into superimposed relation with respect to each other and said first channel having an upwardly extending slope in the vicinity of said narrow overlapping area whereby movement of the slider between said overlapping belt ends will bring the loops on said overlapping belt ends into superimposed relation and bring the loops on the belt ends in said first channel upwardly into meshing engagement with the loops on the belt end located in said second channel.

2. A slide as set forth in claim 1 wherein said first channel is formed as a recess in the upper surface of said base plate and said second channel is formed as a recess in the upper surface of said intermediate plate with said intermediate plate covering said first channel, said top plate having a first portion covering said second channel and a second portion being disposed in spaced parallel relation to said base plate adjacent said narrow overlapping area and said slope extending upwardly from the bottom of said first channel to the upper surface of said first plate.

3. A slide as set forth in claim 2 further comprising an aperture in said second portion of said top plate adjacent said slope and spring biased pusher means carried by said top plate and extending through said aperture adjacent said narrow overlapping are to assist in forcing the loops on said belt ends into intermeshing engagement.

* * * * *